United States Patent

Chana et al.

[11] 3,999,449
[45] Dec. 28, 1976

[54] TURBINE ENGINE COMPRESSOR DISCHARGE PRESSURE MODULATED TRANSMISSION

[75] Inventors: Howard E. Chana, Troy; Roderick G. Tipping, Brighton, both of Mich.

[73] Assignee: General Motors Corporation, Detroit, Mich.

[22] Filed: May 1, 1975

[21] Appl. No.: 573,612

[52] U.S. Cl. .................................. 74/844; 92/36
[51] Int. Cl.² ....................................... B60K 23/00
[58] Field of Search ............ 74/844, 861, 645, 863, 74/864, 472, DIG. 5; 92/36

[56] References Cited

UNITED STATES PATENTS

| | | | |
|---|---|---|---|
| 3,084,901 | 4/1963 | Thorburn | 92/36 X |
| 3,106,104 | 10/1963 | Harry | 92/36 UX |
| 3,228,197 | 1/1966 | Tipping | 92/36 UX |
| 3,295,388 | 1/1967 | Groves | 74/844 |
| 3,765,272 | 10/1973 | Kolehmainen et al. | 74/844 X |
| 3,888,143 | 6/1975 | Kolehmainen et al. | 74/863 |
| 3,941,035 | 3/1976 | Mueller | 92/36 X |

Primary Examiner—Everette A. Powell, Jr.
Attorney, Agent, or Firm—A. M. Heiter

[57] ABSTRACT

A gas turbine engine and automatic transmission power train having a modulator valve controlled by an engine compressor pressure and altitude responsive force actuator and a speed governor to provide a modulator pressure increasing with increasing engine power during normal engine operation and decreasing with increasing output speed operative to increase friction drive capacity and increase upshift speed with increasing modulator pressure. The force actuator provides a force which increases with increasing compressor discharge pressure and an altitude aneroid provides an opposing force decreasing with increasing altitude so the net actuator apply force increases with increasing compressor discharge pressure and altitude and is the same at the same engine power at all altitudes. The actuator has a compressor discharge pressure chamber having on one side a small apply diaphragm connected to a force apply member and on the other side a large release diaphragm and an apply spring acting through the diaphragms on the force apply member. When the engine is operating, minimum to maximum normal operating range compressor discharge pressure acts on the release diaphragm to disable the apply spring and on the apply diaphragm to provide with aneroid altitude correction an apply force increasing from a low value to a high value as compressor discharge pressure increases from minimum to maximum. On engine shut down or other loss of compressor discharge pressure when the engine is operating, as compressor discharge pressure decreases below the minimum operating value the release diaphragm release force is reduced and when compressor discharge pressure equals atmospheric pressure the apply spring force transmitted to the apply member provides a high modulator pressure operative in the transmission to delay upshifts to indicate this condition and to meet maximum drive torque requirements.

17 Claims, 4 Drawing Figures

TURBINE ENGINE COMPRESSOR DISCHARGE PRESSURE MODULATED TRANSMISSION

SUMMARY OF THE INVENTION

The invention relates to torque demand force actuators and particularly to gas turbine engine and transmission power trains having a compressor discharge pressure actuated force actuator in the control system.

The invention provides an engine and power shift transmission power train having an improved torque demand modulated pressure system responsive to an engine torque demand fluid pressure signal provided by the engine and increasing with increasing torque demand. The modulated pressure is used in power shift transmissions to increase the torque capacity with increased capacity requirements and the rate of establishment of transmission drives to meet smoothness requirements and in automatic transmissions to also vary the response to speed of the automatic shift valves to provide upshifts at higher speeds with increasing torque demand. The modulated pressure system employs a fluid pressure force actuator providing an apply force to a modulated pressure regulator valve to regulate modulated pressure proportional to the apply force and may also reduce modulated pressure with increasing speed. The modulated pressure system provides a modulator force to control modulator pressure which varies as a function of the torque demand signal increasing with torque demand and corrected for altitude changes. The modulator apply force increases with increasing torque demand signal pressure and is corrected with changes in altitude to provide the same modulator force at the same power at all altitudes in the normal engine operating torque demand signal range. When the torque demand signal value is less than the minimum value of the torque demand signal in the normal engine operating range, the modulator pressure system provides a torque demand signal similar to the torque demand signal provided in the high torque demand portion of the normal engine operating range.

In power trains having a gas turbine engine and an automatic transmission, the gas turbine engine compressor provides a compressor discharge gas pressure which is applied to the fuel burning apparatus to drive the turbine means which drives the compressor and load shaft. The compressor discharge pressure is employed as a torque and power demand signal. The compressor discharge pressure increases with increasing compressor speed. The compressor discharge pressure increases as an engine torque demand signal with increasing fuel feed at constant speed or power and as a power demand signal with increasing fuel feed at constant speed or torque. The transmission has a modulator valve responsive to a torque demand force providing a torque demand pressure to increase the drive ratio engaging pressure with increasing torque requirements and to increase the downshift bias on the automatic shift valves. The improved force actuator is responsive to compressor discharge pressure and provides a modulator apply force increasing with increasing compressor discharge pressure and has an altitude correction aneroid or bellows to provide the same force at the same torque and power demand at all altitudes. Since the compressor discharge pressure varies with altitude and thus changes relative to torque and power demand as altitude changes, the altitude correction bellows is employed to provide a correction force so that the compressor discharge pressure force is corrected to be the same at the same torque and power demand. Thus at the same engine power the torque and power demand or modulator force is the same at the same power level at all altitudes. The compressor discharge pressure actuator has a compressor pressure chamber with a small compressor pressure movable apply wall on one side connected to a force apply member, a bellows connected to the force apply member, a large movable release wall on the other side, and a high force spring biasing the large movable wall toward the small movable wall. When the compressor pressure is in a non-operating range between atmospheric, the base value, and a little less than or up to the operating range the high force spring acts to move the large movable wall to engage the small movable wall and the apply member. When compressor pressure is at atmospheric so the release wall does not reduce the biasing force, the biasing spring provides a high apply force. This occurs when the engine is shut down and when there is a loss of compressor discharge pressure in the actuator chamber during engine operation so there is a high actuator apply force to provide a high power level modulator pressure so the transmission ratio engaging devices will operate without damage at all power levels and upshifts will occur at higher speeds to indicate the loss of compressor discharge pressure controlled modulator pressure to the operator. When the engine is started as the engine speed increases in a nonoperating range up to normal idle speed, the compressor discharge pressure increases and acts on the large movable wall to fully oppose and deactivate the high force spring and acts on the small diaphragm to provide in conjunction with the bellows, the idle speed apply force. As compressor discharge pressure further increases in the engine operating range, from engine idle power to maximum power, the compressor discharge pressure acts on the large movable wall to continue to disable the high force spring and on the small movable wall to increase the apply force to provide the idle to maximum power modulator pressure.

These and other features of the invention will be apparent from the following description and drawing.

Figure 1:
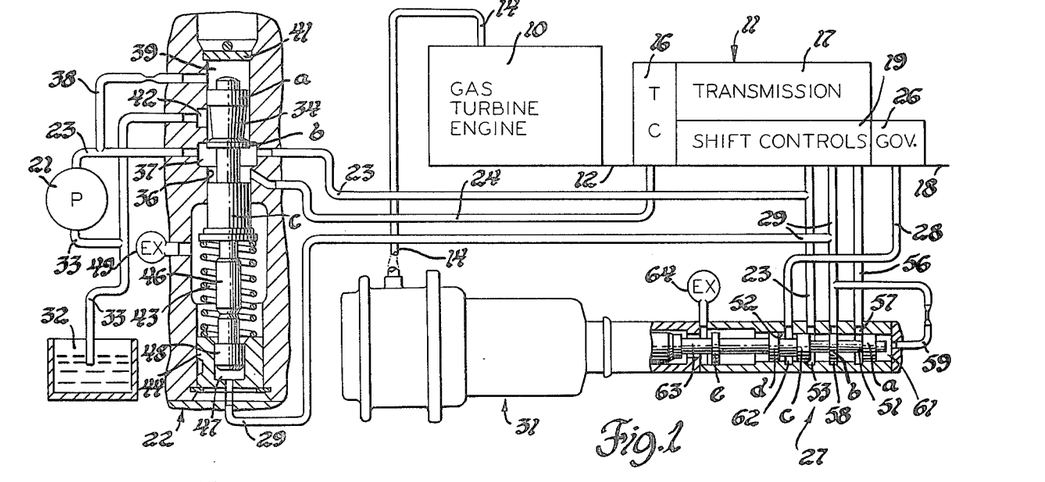
FIG. 1 is a schematic view of the gas turbine engine automatic transmission power train with the compressor discharge pressure actuated modulator pressure control.

FIG. 1 shows the power train having a conventional gas turbine engine 10 and transmission assembly 11. The engine, preferably of the two shaft type, has a power turbine driving engine output or transmission input shaft 12 and gas generating apparatus including a compressor driven by a compressor turbine and delivering compressor discharge pressure to the compressor discharge pressure line 14 and the combustion chamber which is also supplied with fuel by the fuel feed system. Other conventional gas turbine engines such as the two shaft gas turbine engine with power transfer clutch as shown in Flanigan et al U.S. Pat. No. 3,237,404 patented Mar. 1, 1966 or single shaft gas turbine engines may be used. The transmission assembly 11 may have a torque converter T.C. 16 or other conventional input, such as a slipping clutch and/or fluid drive, driven by input shaft 12. The transmission has a multiratio gear transmission unit 17 having a plurality of friction drive establishing devices connected in series between input shaft 12 and output shaft 18. The transmission also has conventional shift controls 19 to automatically selectively operate the friction drive establishing devices in response to speed and torque demand to provide a plurality of ratio drives, i.e., as shown in Van Lent et al. U.S. Pat. No. 3,541,887 patented Nov. 24, 1970 and Winchell et al. 3,321,056 patented May 23, 1967.

The conventional input driven pump 21 and main line regulator valve 22 supply regulated pressure to main line 23 with first overage to converter feed line 24. The main line is connected to the shift controls 19, governor 26 and modulator valve 27.

The governor 26 is driven by output shaft 18 and provides in governor line 28 a governor signal pressure proportional to output speed. The modulator valve 27 provides modulator pressure in line 29 to the shift controls 19 and main line regulator valve 22. The altitude corrected compressor discharge pressure modulator force actuator 31 controls the modulator or regulator valve 27. The transmission assembly 11 may have the torque converter 16, the transmission gearing and ratio establishing devices 17, the shift controls 19, governor 26 and modulator valve 27 as shown in Winchell et al. U.S. Pat. No. 3,321,056 patented May 23, 1967.

The pump 21 receives fluid from the sump 32 through suction line 33 and delivers fluid to main line 23. The main line regulator valve 22 has a valve element 34 having equal diameter lands, $a$, $b$ and $c$ in bore 36. The main line 23 is always connected at port 37 to the bore between lands $b$ and $c$ and by a restricted branch passage 38 to the chamber 39 at the end of the bore closed by plug 41 secured by a pin. Suction line 33 at suction port 42 is always connected between lands $a$ and $b$. A spring 43 seats on end closure 44 and engages the land $c$ and is guided by stem 46 on the valve element. Modulator line 29 is connected to cylinder 47 in closure 44 to act on piston 48 engaging stem 46 of valve element 34 to provide a modulator bias assisting the spring bias. The bore portion containing the spring is vented by exhaust 49 which may be in the body or closure 44. Main line pressure line 23 acts via branch 38 in chamber 39 when main line pressure is at the regulated value to move valve element 34 against the bias of the spring 43 and modulator piston 48 to connect first overage to the converter feed line 24 and when both main line 23 and converter feed line 24 are at regulated pressure to further move the valve element to exhaust main line to suction port 42 and suction line 33. The modulator piston 48 increases main line pressure as a function of modulator pressure.

The modulator valve 27 has a valve element 51 having small diameter lands $a$, $b$ and $c$ and large land $d$ and a non sealing guide land $e$ in a stepped bore 52. Main line 23 at port 53 is always open to the space between lands $b$ and $c$. Exhaust line 56 at exhaust port 57 is always open to the space between lands $a$ and $b$. The line 56 is called an exhaust line since it functions during normal transmission operations to provide the exhaust for modulation by the modulator valve, but in conventional transmissions, i.e., Winchell et al. above noted, line 56 also supplies detent pressure to the modulator valve to discontinue modulation during detent operation of the transmission. Modulator line 29 is connected to port 58 which has substantially the same width as land $b$ and by modulator restricted branch 59 to the closed chamber 61 in the end of the bore. Governor pressure line 28 is always connected at port 62 to the bore between the lands $c$ and $d$ to act on the unbalanced area of larger land $d$ and to provide a small decrease of modulator pressure as a function of increasing governor pressure and speed. When the apply force of modulator actuator 31 is balanced by modulator pressure in chamber 61 acting on land $51a$, and governor pressure acting on the unbalanced area of land $51d$, the land $b$ blocks modulator line port 58 and main line port 53 is blocked between lands $b$ and $c$ to maintain the pressure. When modulator actuator apply force exceeds the modulator pressure force the valve is moved to the right as viewed in the drawing to a feed position connecting main line port 53 to modulator port 58 to connect main line to modulator line for feed to increase modulator pressure. When the modulator pressure force exceeds the actuator apply force, modulator pressure in chamber 61 moves the valve element to the left as viewed or to exhaust position connecting modulator port 58 between lands $a$ and $b$ to exhaust port 57 to lower modulator pressure. The modulator valve element 51 has a stem 63 beyond guide line $e$ for receiving force from actuator 31. Leakage fluid exhausts past guide land $e$ in the axially long oil air vent exhaust 64 which also permits air to enter the actuator air chamber 121.

Figure 2:
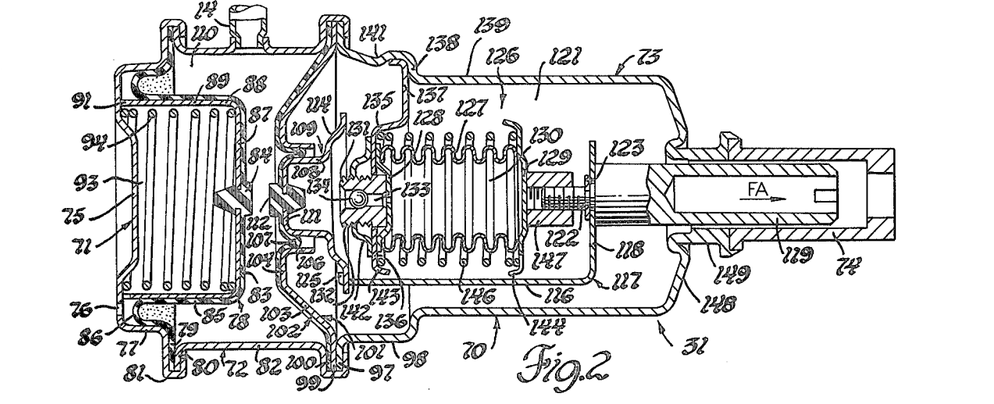
FIG. 2 is a detail sectional view of the compressor discharge pressure operated force actuator.

The compressor discharge pressure modulator actuator 31 as shown in FIG. 2 has a case 70 having end or upper case portion 71, an intermediate case portion 72, a base or lower case portion 73 and a support sleeve portion 74. The sleeve portion is fixed on or in the transmission housing and is in axial alignment with the modulator valve 27. The upper case portion 71 has an end wall 75 having an atmospheric vent 76 and an adjacent end cylindrical wall portion 77 determining the operating effective area of upper or release roll diaphragm 78 which is made of a conventional flexible diaphragm material, i.e., a rubber like material reinforced with a fabric. The flat outer edge or perimeter 79 of the roll diaphragm and the flange 80 of intermediate case 72 are both sealed and secured in the rolled over or crimped U-shaped flange 81 formed on the end of the upper case cylindrical wall portion 77 to seal the diaphragm to the case 70 and end case 71 to the intermediate cylindrical wall portion 82 of intermediate case 72. The upper one-piece diaphragm 78 has a flat transverse central portion 83 with a centrally located integral bumper grommet portion 84, a cylindrical portion 85, an annular rolling portion 86 and the peripheral portion 79. The central portion 83 is internally supported by flat circular end wall portion 87 of cup support member 88 and secured by the grommet 84 which has a groove fitting in an aperture in end wall 87. The cup member 88 has a cylindrical skirt portion 89 supporting cylindrical diaphragm portion 85. The skirt 89 has an end edge 91 to limit diaphragm movement and compression of upper spring 94 on engagement with wall 75 without effecting a seal so atmospheric air entering through vent 76 in end wall 75 to upper atmospheric air chamber 93 is always effective on the full effective area of upper diaphragm 78. The cup or end edge 91 may have an opening or recess to prevent sealing. The upper spring 94 seats on case end wall 75 and cup end wall 87 and is guided within the cup skirt 89 and biases the diaphragm 78 in the force apply direction, arrow FA. The bumper grommet 84, an integral portion of diaphragm 78, has a groove fitting an aperture in end wall 87 to secure the bumper grommet to the cup end wall 87 with a portion thicker than diaphragm end wall 83 to engage a similar grommet 112 to keep the diaphragm end wall 83 out of contact with the lower diaphragm 102 and to transmit force to the bumper grommet 112 and lower diaphragm 102.

The intermediate case 72 has at the lower end of cylindrical intermediate wall 82 a U-shaped flange which is crimped over and secures and seals together and to the case flange 97 on the larger cylindrical wall portion 98 of lower case 73, the outer perimeter 99 of annular diaphragm support 101 and the outer perimeter 100 of lower or apply flexible roll diaphragm 102. The transverse fixed support 101 has an intermediate annular conical portion 103, an annular flat central portion 104 rounded to the axial flange portion 106 to contact and support the diaphragm with similar portions for rolling at the diaphragm roll portion 107 between fixed flange 106 and movable axial skirt or flange 108 on the movable diaphragm support cup 109. The movable cup member 109 curves from flange 108 into the flat transverse end wall portion 111. The lower diaphragm 102 is supported and attached to the central flat end wall portion 111 of the movable cup support member 109 by a similar integral bumper grommet portion 112. The bumper grommet 112 has a groove fitting into an aperture in end wall 111 to secure the bumper grommet and integral diaphragm in place with a bumper portion above the diaphragm end wall so the bumper grommets 112 and 84 engage to transmit force from one movable diaphragm support 88 to the other movable diaphragm support member 109 to prevent engagement and thus wear and damage of the diaphragms. The upper diaphragm 78, the lower diaphragm 102 and intermediate wall portion 82 enclose the compressor discharge pressure chamber 110 connected by compressor discharge pressure line 14 to the gas turbine engine compressor discharge. The movable cup support member 109 has an outwardly extending connecting flange portion 114 connected by a tongue and slot connection 115 to each of the three arms 116 (only one is shown in the FIG. 2 section) of a diaphragm force apply strut member 117 having a base portion 118. The tongue and slot connections 115 are provided by a tongue on the end of each arm 116 extending through a slot in flange 114 and bent over as shown. The force apply rod 119 is located for guidance in support sleeve 74 with sufficient clearance between these members for atmospheric air communication from ar vent exhaust 64, FIG. 1 through sleeve 74 to lower aneroid atmospheric air chamber 121 defined by lower case 73 and lower diaphragm 102. The rod 119 applies or transmits the total or net modulator apply force, arrow FA, to stem 63 of modulator valve element 51. A screw stud 122 is integral with or fixed to the input end of the apply rod 119 and extends through an aperture in base 117 of strut member 118. A snap ring 123 fixed on stud 122 holds strut base 118 against the input end of rod 119. The flange 114 of movable cup member 109 will not, during normal operation, engage the end of flange 106 on fixed support member 101 as this is prevented by the limit of modulating or regulating movement of valve element 51 but will engage when not assembled with the valve 27 to prevent excessive movement which would move the roll diaphragm 102 from between the axial flanges 106–108 and or stretch the diaphragm. This limit of excessive movement may also be provided by engagement of grommets 84 and 112. As explained below, the grommets do not engage when normal engine compressor discharge pressure is supplied to chamber 110. The valve element 51 engages the end of the bore 52 to provide a limit of movement to prevent excessive movement of diaphragm 102 and cup 109 so it does not, during operation, contact aneroid assembly 126, but such contact would occur to prevent diaphragm stretching when the actuator 31 is not assembled with the modulator valve 27.

The aneroid assembly 126 has a bellows 127 secured and sealed to end walls 128, 129 to form aneroid chamber 130 which is partially or fully evacuated to have a predetermined degree of vacuum. The evacuation fitting 131 is secured and sealed, i.e., welded, to the exterior surface of end wall 128 and has external threads 132 to receive the evacuation machine fitting and a central opening 133 through the fitting 131 and wall 128 which is used for evacuation and is sealed by a ball seal 134.

A spider support 135 has a central base portion 136 having a central aperture fitting on fitting 131 to locate the spider support relative to end wall 128 and three arms 137 (one being shown in the FIG. 2 section) extending radially outward and engaging shoulder 138 between the larger diameter cylindrical wall portion 98 and the smaller diameter cylindrical wall portion 139 of lower case 73. The arms 137 have a transverse foot portion at the end which engages wall portion 98. A stake dent 141 in wall portion 98 abuts the foot portion and secures the arms against shoulder and to lower case 73. A sheet metal nut 142 is secured to the threads on the fitting 131 and engages the spider base 136 to clamp spider 135 to end wall 128 to form an end wall assembly. The spider base of this end wall assembly has a peripheral flange 143 and the end wall 129 has a peripheral flange 144 facing each other and retaining and locating spring 146 between the end walls in a position seated on the end walls and externally circumferentially spaced from the aneroid bellows 127. A threaded nut 147 is secured, i.e., by welding, to the exterior of aneroid end wall 129 and receives stud 122 to transmit aneroid force to the apply rod 119. The rod 119 may be turned freely in force apply member 117 without causing relative axial movement but such turning between nut 147 and stud 122 causes relative axial movement between the rod 119 and aneroid 126 for aneroid force adjustment. In the preferred embodiment the aneroid force is negative, i.e., in the opposite direction to the positive apply force FA. The lower case 73 at the end of smaller wall portion 139 has a base wall 148 faired inwardly and reversely curved into a sleeve portion 149 having a flanged end aligned with sleeve 74. The sleeve portion 149 may be externally secured to the transmission housing or to sleeve 74 to support the modulator actuator 31 in a fixed position.

OPERATION

In the conventional gas turbine engine during normal drive operation, the compressor thereof provides a compressor discharge pressure signal to line 14 and compressor discharge pressure to the fuel feed and burning apparatus to drive the power turbine which drives output shaft 12. Conventional two shaft gas connected type gas turbine engines provide a gasifier or compressor discharge pressure CDP relative to compressor speed CS and to engine power PO increasing with increasing compressor speed and power and decreasing with increasing altitude, due to the decreasing ambient atmospheric pressure with increasing altitude, characteristically as shown by the FIG. 3 graph plotting compressor discharge pressure CDP relative to power PO, the power curves PO and relative to gasifier compressor speed CS, the compressor speed curves CS, both at sea level SL, 5,000 ft. altitude 5 and 10,000 ft. altitude 10. In such engines also having a power transfer clutch and control, i.e., Flanigan et al 3,237,404, high compressor discharge pressure is also provided during overrun or coast drive. The engine drives a basically conventional transmission 11 providing a plurality of drive ratios and having power shift controls 19. Such controls include a main line regulator valve 22 which provides regulated main line pressure in line 23 increasing with increasing torque or power demand or in a gas turbine application with increasing compressor discharge pressure. The shift controls are preferably conventional automatic shift controls which automatically shift between ratio drives in response to transmission output speed and torque or power demand modulator pressure supplied by line 29. The modulator valve 27 as explained above provides modulator pressure directly proportional to the modulator actuator total or net apply force applied by a modulator actuator 31 but it will be appreciated that another conventional control system with a modulator valve providing a modulator pressure inversely proportional to modulator actuator force, i.e., Schaefer U.S. Pat. No. 3,587,355 patented June 28, 1971, could be used.

Figure 3:
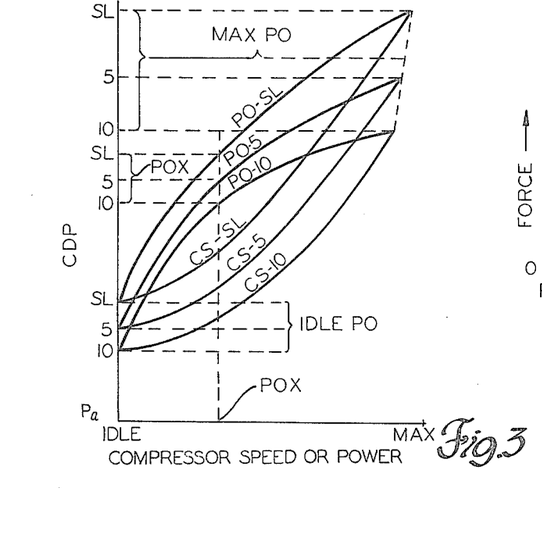
FIG. 3 is a plot of compressor discharge pressure relative to compressor speed and power for a gas turbine engine.

The force delivered by the modulator actuator 31 through force apply rod 119 and thus modulator pressure increases with increasing compressor discharge pressure and is increased with increasing altitude relative to the lower compressor discharge pressures provided at lower altitudes. At higher altitudes, the barometric or ambient atmospheric air pressure is lower, so the compressor discharge pressure relative to the same power is lower as indicated in FIG. 3. However, it is not desirable to reduce the modulator pressure for controlling the automatic shift valves at the same high rate of reduction provided when compressor discharge pressure is reduced by a reduction of power, when compressor discharge pressure is reduced by increasing altitude. Thus at higher altitudes the modulator force and pressure is higher relative to the same compressor discharge pressure. The actuator provides the same total apply force at the same engine power at all altitudes. The force actuator provides a total apply force responsive to compressor discharge pressure and altitude applied to the modulator valve element to provide a proportionate modulator pressure. The governor pressure also independently acts on the modulator valve to decrease modulator pressure with increasing speed.

Figure 4:
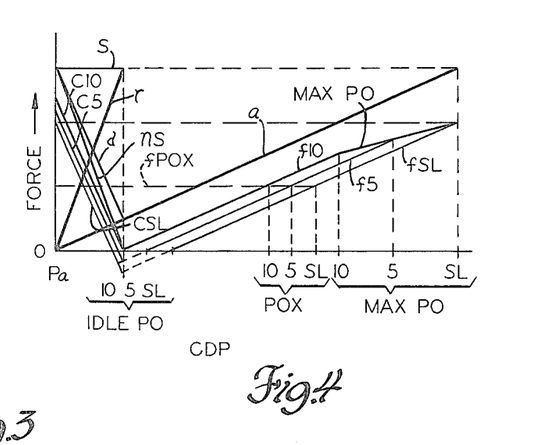
FIG. 4 is a plot of actuator force relative to compressor discharge pressure for the force actuator.

The modulator force actuator 31 is shown in FIG. 2 in the normal engine operating and regulating position in the normal engine operating range applying a force arrow FA, to modulator valve element 51 in regulating position with any normal operating range compressor discharge pressure delivered by line 14 to compressor discharge pressure chamber 110. Any normal engine operating range compressor discharge pressure from minimum at idle power for 10,000 ft. altitude, IDLE PO-10, to maximum at maximum power at sea level, MAX. PO-SL acts on the large area of upper or release diaphragm 78 with a force, curve r, sufficient to fully compress spring 94 having a force s with cup support member 88 supporting upper diaphragm 78 and engaging end wall 75 in the released position shown. The force of spring 94, curve s, less the force of release diaphragm 78, force curve r, provides a net force, curve ns which is zero when compressor discharge pressure approaches and is in the operating range. The compressor discharge pressure acts on the small area of lower or apply diaphragm 102 to provide a compressor discharge pressure force, curve a, proportional to compressor discharge pressure which is transmitted by support 109 and force apply member 117 to apply rod 119. The spider 135 provides a fixed seat for spring 146 providing a constant positive apply force which is reduced by the negative aneroid chamber force, the force of barometric pressure which decreases with increasing altitude, acting on the aneroid bellows 127. Thus the net force provided by the aneroid assembly, the combination of a weak or low positive force aneroid spring 146 and high negative force vacuum aneroid chamber 130, is negative and increases with increasing altitude or lowering of barometric pressure. This net negative force is transmitted by end wall 129, nut 147, and stud 122 to apply rod 119. Since the compressor discharge pressure and thus the compressor discharge pressure apply diaphragm force, curve a, has a moderate value at idle power and increases with compressor discharge pressure and many conventional transmissions have a modulator pressure which is zero at idle power, the net negative force of the aneroid assembly reduces the apply diaphragm force, curve $a$, to the total or net apply force, curves $fSL$, $f5$ and $f10$ so that the total apply force at each altitude is zero at the compressor discharge pressure for idle power respectively at each altitude SL, 5 and 10 and increases at the same rate with increasing compressor discharge pressure so the total apply force curves $fSL$, $f5$, $f10$ are parallel to each other and curve a and extend up to the maximum power at each altitude. At any illustrative power POX, FIG. 3, the compressor discharge pressure has a value at each altitude POX, SL, 5 and 10. Referring to the same compressor discharge pressure scale CDP in FIG. 4, plotted from the base value, atmospheric pressure Pa, to maximum at MAX PO at SL, these compressor discharge pressure values POX, SL, 5 and 10 at their respective apply force curves f at the same altitude provide the same force as indicated by line $f$ POX. Thus the same apply force is provided for the same power at all altitudes. The compressor discharge pressure diaphragm curve a force and the net negative aneroid assembly force provide a total apply force in rod 119 to modulator valve 27 to provide a modulator pressure proportional to the total or net apply force and both varying from a minimum at idle fuel feed and power to a maximum at full fuel feed and maximum power. When the engine is shut down or compressor discharge pressure line 14 does not supply compressor discharge pressure to chamber 110, even when the engine is operating the pressure in chamber 110 will be the base value, atmospheric Pa. Then the full force of spring 94 curve $s$ will be applied through contacting bumper grommets 84 and 112 of the diaphragms to force apply member 117, which will be reduced by the same negative net aneroid assembly force, the vertical distance between curve a and curves $fSL$, $f5$ and $f10$ to provide at atmospheric compressor discharge pressure CDP-Pa, high mechanical apply force values at each altitude at the Pa point of the net spring bias apply force curves, C-SL, C-5 and C-10. These values are high like the high CDP pressure apply force at maximum power at sea level. If this occurs when the engine and transmission are operating, the high force will maintain high modulator pressure so the main line pressure will always be sufficiently high to engage the friction drive, clutches and brakes, to prevent high slip which would cause high wear. At lower power there would be increased shift shock and upshifts to higher ratios in automatic shift controls would be delayed to higher than normal speeds to indicate this condition to the operator.

When compressor discharge pressure in chamber 110 increases from atmospheric Pa in the engine non operating range, the net force of spring 94, curve ns, is increased by the compressor discharge pressure acting on the apply diaphragm, force curve a, to provide the total of these forces on strut member 117, force curve d. Since the aneroid assembly negative force decreases with increasing altitude, the net bias force curves at each altitude C-SL, C-5 and C-10 are parallel to curve d, and decrease to zero force just before the compressor discharge pressure increases to the minimum value idle power at 10,000 ft altitude in the engine operating range.

The net apply force FA at apply rod 119 for various compressor discharge pressures and the area and force value of the components may be expressed by the following equations in which:

$Ss$ = force of mechanical apply spring 94. — lbs
$Ar$ = effective area of release diaphragm 78. — $in^2$
$Ap$ = effective area of pressure diaphragm 102 — $in^2$
$Aa$ = effective area of aneroid chamber 130 — $in^2$
$Sa$ = force of aneroid spring 146 — lbs
$Pa$ = absolute atmospheric pressure (i.e14.7)—lbs/$in^2$
$Pcdp$ = absolute compressor discharge pressure —lbs/$in^2$
$F$ = total apply force at rod 119 —lbs.

When absolute compressor discharge pressure values are in the normal engine operating range at all altitudes.

$$(Pcdp - Pa) Ap + [Sa - Pa (Aa)] = F$$

When absolute compressor discharge pressure is less than the normal engine operating range.

$$](Pa - Pcdp) Ar + Ss] + (Pcdp - Pa) Ap + [Sa - Pa(Aa)] = F$$

The relationship of $Ap$, $Aa$ and $Sa$ is selected to give the desired value of F with proper changes in its values as Pa changes. The relationship of $Ar$ and $Ss$ are selected so that when Pcdp is atmospheric, F will be high and preferably close to the value attained when Pcdp is a maximum, i.e., $(Pa - Pcdp$ at maximum$) Ar \geq Ss$. The selection of Ar and Ss is also such that when Pcdp is at or near its maximum value in the engine non operating range below the engine operating range, the force Ss of spring 94 is uncoupled or completely counteracted by the force of the release diaphragm Ar and does not contribute to total force F. The aneroid force $[Sa - Pa(Aa)]$ is always negative in the preferred embodiment illustrated in FIG. 4, so the idle power force F is zero. Since transmission controls may use a higher force at idle, the aneroid force may be part negative and part positive, i.e., the sea level fSL may be below curve a and high altitude curves i.e., F-10 above curve a with the same structure and a weaker spring Sa. The aneroid assembly may have zero or a positive force at sea level so the sea level force curve fSL is the same as or above curve a and the higher altitude curves above the sea level curve. To make the altitude correction negative instead of positive as in the above preferred embodiment for an engine providing increased power with increased altitude, the aneroid is reversed so the end wall in the location of end wall 129 is fixed to the case and the other end wall 128 fixed to force member 117.

In the above description upper and lower and right and left are merely used for easy reference to the drawing but it will be appreciated that the valves and actuator may be placed in any position.

It will be appreciated that the above described preferred embodiments of the invention may be modified.

It is claimed:

1. In a force actuator for control of an engine driven transmission; force actuator means having a force member providing a total apply force for transmission control, biasing means operatively connected to said force member to apply a high biasing apply force to said force member, chamber means for receiving an engine fluid pressure generated by and employed in the operation of an engine and increasing with increasing torque demand from a base pressure value to a low pressure value below the minimum pressure value of the normal engine operating range and from said minimum pressure value to a maximum pressure value in the normal engine operating range including first pressure responsive means providing a torque demand apply force to said force member varying from a base value through a minimum torque demand value to a maximum torque demand value as a function of engine fluid pressure variation respectively from a base value through a minimum pressure value to a maximum pressure value in the normal engine operating range and second fluid pressure responsive means responsive to engine fluid pressure operatively connected to said biasing means to control said biasing apply force operative when the engine fluid pressure is in said minimum pressure value to maximum pressure value normal engine operating range to disable said biasing means to permit operation of said first fluid pressure to responsive means to provide the total apply force varying as a function of the torque demand apply force and when the engine fluid pressure varies to said base value to permit said biasing means to provide a biasing force to provide a high total apply force similar to the maximum total apply force in the normal engine operating range.

2. The invention defined in claim 1 and aneroid means operatively connected to said force member for operation in response to atmospheric pressure to increase the total apply force with increasing altitude.

3. The invention defined in claim 1 said chamber means also including a tubular case and said first and second fluid pressure responsive means being respectively first and second diaphragms transversely positioned in said case forming first and second opposite sides of said chamber means with the engine fluid pressure contacting the internal sides of both diaphragms; force transmitting means on the internal sides of said diaphragms; said force member being located adjacent to and being operatively connected to the external side of said first diaphragm and said biasing means being a spring located on the external side of said second diaphragm and seated on said case and engaging the external side of said second diaphragm and biasing said second diaphragm toward said first diaphragm to engage and transmit said biasing force to said force member when engine fluid pressure is from said base value to said low value and moving said second diaphragm to disengage said force transmitting means when said engine fluid pressure is in said operating range.

4. The invention defined in claim 3 and said engine fluid pressure being gas turbine engine compressor discharge pressure.

5. In a compressor discharge pressure actuator for transmission modulator pressure regulator valves; strut means operative to transmit a total modulator pressure force; biasing means providing a biasing force and compressor discharge pressure responsive means including a first movable wall connected to said strut means and movable by compressor discharge pressure to transmit a compressor discharge pressure force to said strut means, a second movable wall connected to said biasing means for movement toward said first movable wall by said biasing force and movable by compressor discharge pressure away from said first movable wall against said biasing means to free said first movable wall for movement in response to compressor discharge pressure and movable in the absence of compressor discharge pressure by said biasing means to engage said first movable wall to apply a biasing force to said first movable wall and strut means.

6. The invention defined in claim 4 and aneroid means connected to said strut means to provide an aneroid force of said total modulator pressure force and operative at sea level in response to high atmospheric pressure to provide a minimum aneroid force and at increasing altitudes in response to decreasing atmospheric pressure to provide an increasing aneroid force.

7. The invention defined in claim 5 and compressor discharge pressure varying at the same power level with varying altitude and said aneroid force correcting said compressor discharge force to provide the same total modulator pressure force at the same engine power level at all altitudes.

8. In a gas turbine engine compressor discharge pressure actuator for transmission modulator pressure regulator valves; a case; strut means operative to transmit a total modulator pressure force; aneroid means connected to said strut means to provide the atmospheric force component of said modulator pressure force and operative at sea level in response to high atmospheric pressure to provide a minimum atmospheric force component and at increasing altitudes in response to decreasing atmospheric pressure to provide an increasing atmospheric force component; biasing means mounted on said case providing a bias force and compressor discharge pressure responsive means including a first movable wall located adjacent to and connected to said strut means and movable by compressor discharge pressure to transmit a compressor discharge pressure force component to said strut means, a second movable wall located adjacent to and connected to said biasing means and movable by compressor discharge pressure away from said first movable wall adjacent against said biasing means to free said first movable wall for movement in response to compressor discharge pressure and movable in the absence of compressor discharge pressure by said biasing means to engage said first movable wall to apply a biasing force to said first movable wall and strut means, said first and said second movable walls sealed in said case to provide a chamber therebetween supplied with compressor discharge pressure to act on said second movable wall to move said second movable wall against said biasing means away from said first movable wall and to act on said first movable wall to provide a compressor discharge pressure force component increasing from a minimum to a maximum with compressor discharge pressure to said strut means which is combined with said atmospheric force component to provide said modulator pressure force varying between a minimum and a maximum and operative in the absence of compressor discharge pressure to permit said biasing means to move second movable wall to engage said first movable wall to provide a bias force component having a value equal to a high compressor discharge pressure force component to said strut means to provide a modulator pressure force haing a value near the value provided by maximum compressor discharge pressure.

9. In a power train; an engine having engine operating means generating an engine fluid pressure employed in the operation of the engine and increasing with increasing fuel feed from a base pressure value and through the normal engine operating range from a minimum pressure value to a maximum pressure value from idle torque demand to maximum torque demand during normal engine operation with idle to full fuel feed; a transmission having a fluid operated drive establishing friction device for selectively establishing a drive in response to the supply of control fluid and control means having a modulator valve having a force member responsive to an apply force in one direction to provide a modulator pressure proportional to said apply force and selectively connecting fluid to said device for drive; force actuator means having biasing means operatively connected to said force member to at times apply a high biasing apply force to said force member in said one direction; chamber means operatively connected to said engine to receive said engine fluid pressure including first movable wall means operatively connected to said force member operative in response to said engine fluid pressure to provide a pressure apply force in said one direction on said force member and modulator pressure value increasing from a base value through a minimum value to a maximum value with increasing engine fluid pressure respectively from said base value through said minimum value to said maximum value and second movable wall means operatively connected to said biasing means operative in response to said engine fluid pressure to oppose said biasing means to provide when said engine fluid pressure is at said base value a net biasing apply force in said one direction and modulator pressure value respectively substantially as large as said maximum pressure apply force value and maximum modulator pressure value, when said engine fluid pressure increases up to said minimum value to decrease said biasing apply force and modulator pressure to said minimum value and when said engine fluid pressure increases from said minimum value to said maximum value to hold said biasing apply force at said minimum value while said pressure biasing force increases said modulator pressure from said minimum to maximum value.

10. The invention defined in claim 9 and aneroid means connected to said force member to provide an aneroid force increasing the apply force with increasing altitude.

11. The invention defined in claim 9 and said engine providing decreasing engine fluid pressure at the same power level with increasing altitude and aneroid means correcting the compressor discharge pressure apply force to provide the same total apply force at the same power level at all altitudes.

12. The invention defined in claim 9 and said engine being a gas turbine engine and said engine fluid pressure being compressor discharge pressure.

13. In a power train; an engine having engine operating means generating an engine fluid pressure employed in the operation of the engine and increasing with increasing fuel feed from a base pressure value to a low pressure value below the minimum pressure value of the normal engine operating range and from said minimum pressure value to a maximum pressure value in the normal engine operating range from idle torque demand to maximum torque demand during normal engine operation with idle to full fuel feed; a transmission having a fluid operated drive establishing friction device for selectively establishing a drive in response to the supply of control fluid with a torque capacity proportional to the pressure of the control fluid, modulator valve means having a force member responsive to an apply force in one direction to increase the pressure of the control fluid proportional to said apply force and control valve means to selectively connect said control fluid to said device for increasing drive torque capacity with increased control fluid pressure; force actuator means having biasing means operatively connected to said force member to selectively apply a high biasing apply force to said force member in said one direction; chamber means operatively connected to said engine to receive said engine fluid pressure including first movable wall means operatively connected to said force member operative in response to said engine fluid pressure to provide a pressure apply force in said one direction on said force member and control pressure value increasing from a base value through a minimum value to a maximum value with increasing engine fluid pressure respectively from said base value through said minimum value to said maximum value and second movable wall means operatively connected to said biasing means operative in response to said engine fluid pressure to oppose said biasing means to provide when said engine fluid pressure is at said base value a net biasing apply force in said one direction and control pressure value respectively substantially as large as said maximum pressure apply force value and maximum control pressure value, when said engine fluid pressure increases up to said low value to decrease said biasing apply force and control pressure to said minimum value and when said engine fluid pressure increases from said minimum value to said maximum value to hold said biasing apply force at said minimum value while said pressure biasing force increases said control pressure from said minimum to maximum value.

14. In a power train, an engine having engine operating means generating an engine fluid pressure employed in the operation of the engine and increasing with increasing fuel feed from a minimum pressure value to a maximum pressure value in the normal engine operating range from idle torque demand to maximum torque demand during normal engine operation with idle to full fuel feed and decreasing at the same engine power level with increasing altitude; a transmission having a fluid operated drive establishing friction device for selectively establishing a drive in response to the supply of control fluid, control means having modulator valve means having a valve element responsive to a total apply force to modulate a modulator pressure and to selectively connect said control fluid to said device for drive; force actuator means having operatively connected chamber means operatively connected to said engine to receive said engine fluid pressure including apply movable wall means operatively connected to said valve element operative in response to said engine fluid pressure to provide a pressure apply force in said one direction on said valve element increasing from a minimum value to a maximum value with increasing engine fluid pressure and aneroid means connected to said valve element to correct said pressure apply force to provide the same total apply force at the same engine power at all altitudes.

15. The invention defined in claim 14 and said engine fluid pressure having a base value below said normal engine operating range and means operative only when said engine fluid pressure is less than said normal engine operating range to provide an apply force higher than the minimum pressure apply force.

16. In a force actuator for an engine having engine operating means generating an engine fluid pressure employed in the operation of the engine and increasing with increasing fuel feed from a base pressure value and through a minimum pressure value to a maximum pressure value in the normal engine operating range from idle torque demand to maximum torque demand during normal engine operation with idle to full fuel feed and a transmission having a fluid operated drive establishing friction device and control means for selectively establishing a drive in response to the supply of control fluid having modulator valve means having a force member responsive to an apply force in one direction to modulate a modulator pressure to said apply force; force actuator means having biasing means operatively connected to said force member to selectively apply a high biasing apply force to said force member in said one direction; chamber means to receive engine fluid pressure including first movable wall means operatively connected to said force member operative in response to engine fluid pressure to provide a pressure apply force in said one direction on said force member increasing from a base value through a minimum value to a maximum value with increasing engine fluid pressure respectively from said base value through said minimum value to said maximum value and second movable wall means operatively connected to said biasing means operative in response to said engine fluid pressure to oppose said biasing means to provide when said engine fluid pressure is at said base value a net biasing apply force in said one direction higher than said minimum pressure apply force value, when said engine fluid pressure increases up to said minimum value to decrease said biasing apply force to said minimum value and when said engine fluid pressure increases from said minimum value to said maximum value to hold said biasing apply force at said minimum value while said pressure biasing force increases from said minimum to maximum value.

17. In a force actuator for an engine having engine operating means generating an engine fluid pressure employed in the operation of the engine and increasing with increasing fuel feed from a base pressure value and through a minimum pressure value to a maximum pressure value in the normal engine operating range from idle torque demand to maximum torque demand during normal engine operation with idle to full fuel feed and the engine fluid pressure varies at the same engine power with increasing altitude and a transmission having a fluid operated drive establishing friction device and control means for selectively establishing a drive in response to the supply of control fluid having modulator valve means having a force member responsive to an apply force in one direction to modulate a modulator pressure to said apply force; force actuator means having chamber means to receive engine fluid pressure including apply movable wall means operatively connected to said force member operative in response to engine fluid pressure to provide a pressure apply force in said one direction on said force member increasing from a base value through a minimum value to a maximum value with increasing engine fluid pressure respectively from said base value through said minimum value to said maximum value and aneroid means connected to said force member to correct said pressure apply force to provide the same apply force at the same engine power at all altitudes.

* * * * *

UNITED STATES PATENT OFFICE
CERTIFICATE OF CORRECTION

Patent No. 3,999,449  Dated December 28, 1976

Inventor(s) Howard E. Chana et al.

It is certified that error appears in the above-identified patent and that said Letters Patent are hereby corrected as shown below:

Column 3, line 48, after "pressure" insert -- in --;

Column 3, line 65, "operations" should be -- operation --;

Column 4, line 8, delete "and" after "land d";

Column 4, line 27, "line" should be -- land --;

Column 5, line 54, "ar" should be -- air --;

Column 5, line 61, numeral "118" should be -- 117 -- and numeral "117" should be -- 118 --;

Column 6, line 35, insert -- 138 -- after "shoulder";

Column 9, line 11, "lower" should be -- low --;

Column 9, line 51, "]" (bracket) should be -- [ --;

Column 10, claim 1, line 48, delete "to" after "pressure";

UNITED STATES PATENT OFFICE
CERTIFICATE OF CORRECTION

Patent No. 3,999,449  Dated December 28, 1976

Inventor(s) Howard L. Chana et al.

It is certified that error appears in the above-identified patent and that said Letters Patent are hereby corrected as shown below:

Column 11, line 65, after "wall" delete "adjacent";

Column 12, claim 8, line 16, after "move" insert -- said --;

Column 13, claim 13, line 30, change "increasing" to -- increased --;

Column 16, claim 17, line 10, after "same" insert -- total --.

Signed and Sealed this

Thirteenth Day of September 1977

[SEAL]

Attest:

RUTH C. MASON  
Attesting Officer

LUTRELLE F. PARKER  
Acting Commissioner of Patents and Trademarks